US011865961B2

(12) United States Patent
French

(10) Patent No.: US 11,865,961 B2
(45) Date of Patent: Jan. 9, 2024

(54) ONE-PIECE COMPOSITE TRAILER

(71) Applicant: Steve French Enterprises Ltd, LLC, Stuart, FL (US)

(72) Inventor: Stephen M. French, Stuart, FL (US)

(73) Assignee: Steve French Enterprises Ltd, LLC, Stuart, FL (US)

( * ) Notice: Subject to any disclaimer, the term of this patent is extended or adjusted under 35 U.S.C. 154(b) by 654 days.

(21) Appl. No.: 17/096,370

(22) Filed: Nov. 12, 2020

(65) Prior Publication Data

US 2021/0138951 A1 May 13, 2021

Related U.S. Application Data

(60) Provisional application No. 62/934,912, filed on Nov. 13, 2019.

(51) Int. Cl.
*B60P 3/10* (2006.01)
(52) U.S. Cl.
CPC ............. *B60P 3/1066* (2013.01); *B60P 3/105* (2013.01); *B60P 3/1075* (2013.01)

(58) Field of Classification Search
CPC ....... B60P 3/1066; B60P 3/105; B60P 3/1033; B62D 21/20; B62D 29/041
See application file for complete search history.

(56) References Cited

U.S. PATENT DOCUMENTS

| 5,417,453 | A | * | 5/1995 | VanDenberg | ........ | B62D 29/041 428/116 |
| 7,828,329 | B2 | | 11/2010 | Biscan | | |
| 8,235,421 | B2 | * | 8/2012 | Biscan | ................ | E04B 1/34352 280/789 |
| 11,518,293 | B2 | * | 12/2022 | French | ................. | B62D 29/041 |

\* cited by examiner

Primary Examiner — Tony H Winner
Assistant Examiner — Hosam Shabara
(74) Attorney, Agent, or Firm — McHale & Slavin, P.A.

(57) ABSTRACT

A trailer frame constructed from a polymer that cannot rust or corrode. The trailer employs a support plate that reinforces an inner and outer wall forming beams that includes a matrix of crisscrossed support walls. A top deck is releasably secured to the frame allowing refinishing of the trailer should the deck be damaged without replacement of the frame. Alternatively the top deck can be a foundation for an enclosure, shield, fence or any other known securement structures.

13 Claims, 8 Drawing Sheets

ONE-PIECE COMPOSITE TRAILER

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 62/934,912, entitled "ONE-PIECE COMPOSITE TRAILER", filed Nov. 13, 2019. The contents of which the above referenced application is incorporated herein by reference.

FEDERALLY SPONSORED RESEARCH OR DEVELOPMENT

Not Applicable

FIELD OF THE INVENTION

This invention is related to the field of trailers and, in particular, to a one-piece composite trailer.

BACKGROUND OF THE INVENTION

Trailers are subject to the U.S. Department of Transportation regulations for strength and safety. Typically, a boat trailer consists of side beams coupled together by use of cross members to form a primary structural support. The side beams come together at the front of the trailer, wherein a trailer hitch is positioned for coupling the trailer to a towing vehicle. The side beams include cradle members to support a boat and a suspension system comprising wheels, brakes and lights.

Conventional construction of a trailer employs steel or aluminum. Since a boat trailer must be partially submerged for retrieving or launching a boat, a boat trailer constructed of galvanized metal is susceptible to rusting and a boat trailer constructed of anodized aluminum is susceptible to corrosion. This is especially problematic when the trailer is used in a saltwater environment.

A trailer that is not used is saltwater typically employs a painted steel structure for the structural support. However, steel frames that are left exposed to the elements can accelerate imperfections in the paint which can metal degradation or rust. Even galvanized steel can quickly develop surface corrosion especially along weld points where the galvanized material is weakest.

High strength corrosion-resistant aluminum alloys is commonly found on trailers used to transport the more expensive boats. An aluminum trailer frame may be welded together, bolted together, or a combination thereof. Aluminum structural members are more expensive than galvanized steel members but retain their appearance longer and provide a lightweight alternative. Aluminum structural members can form different structural shapes and various angles. While aluminum does not rust, aluminum does corrode and usually does so where steel fasteners are used to couple components together. This includes areas where the aluminum has been drilled for receipt of steel fasteners, weld portions, or where the aluminum is clamped together. Once the anodized coating is compromises, corrosion sets in.

A problem with all known prior art steel and aluminum trailers is that rust or corrosion can quickly cause a trailer appearance to deteriorate which can affect the strength of the trailer and the resale value. While aluminum trailers may maintain a better appearance than steel trailers for a period of time, the corrosion of aluminum is inevitable when used for launching boats in saltwater. The cost of a 35 foot open fishing boat now exceeds $500,000 and is typically placed on a trailer that will deteriorate long before the boat life is over. Essentially, a boat that that cost hundreds of thousands of dollars is transported on a trailer design that has not significantly changed in over 50 years. If the trailer fails, damage to the boat is very possible. All known trailers rust, corrode and rot much sooner than the boats that they carry. Since the boat outlasts the trailer, at some point in time the trailer must be maintained or replaced to properly support the boat. Unfortunately, it is not possible to judge the point in time where a rusted frame or corroded component will fail. Even boat bunks made of wood begin degrading the first time they are placed in the water. The average trailer life is less than ten years, and major repairs are typically required within the first five years just to keep the trailer operational.

When a boat is pulled behind a vehicle, the loaded boat trailer is subject to large forces that are amplified as the vehicle speed increases. Higher speeds cause bending, compression, torsion and tensile forces on the trailer that can quickly tear apart frame members affected by rust or corrosion. For safety purposes the primary structural support of a metal frame must be over engineered to anticipate such issues so the boat trailer can safely handle all such forces for years.

U.S. Pat. No. 7,828,329 discloses a transport frame formed from a plurality of polymer beams that interconnected to form a frame. The polymer frame member is held together with adhesive.

What is lacking in the art is a one piece trailer of a design that can meet expected loading using an FRP (fiberglass reinforced polymer) or CFRP (carbon fiber reinforced polymer) that cannot rust, corrode or rot.

SUMMARY OF THE INVENTION

Disclosed is a boat trailer specifically designed for use in saltwater having beams, bolts, hangers, fenders, guide poles, and bunks formed from composite materials that cannot rust or corrode. The boat trailer employs a manufacturing technique that reinforces all beams to distribute forces anticipated during the movement of a boat on the trailer at highway speeds.

An objective of the instant invention is to provide a composite trailer that will last as long as the boat it is designed to carry, and will not degrade from use in saltwater.

Another objective of the instant invention is to provide a composite trailer constructed from an infusion technology that draws plastic resin into fabrics, such as carbon fiber and fiberglass, under a vacuum bag.

An objective of the instant invention is to provide a composite trailer having interchangeable attachments to allow for multi-purpose use.

Another objective of the instant invention is to provide a composite trailer wherein beams, bolts, hangers, fenders, guide poles, and bunks are formed from composite materials that cannot rust or corrode.

Still another objective is to provide a trailer with integrated bunks.

Another objective of the invention is to teach the use of one-piece trailers so as to eliminate the need for fasteners known to cause corrosion.

Other objectives and advantages of this invention will become apparent from the following description taken in conjunction with any accompanying drawings wherein are set forth, by way of illustration and example, certain embodiments of this invention. Any drawings contained

DETAILED DESCRIPTION OF THE PREFERRED EMBODIMENT

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
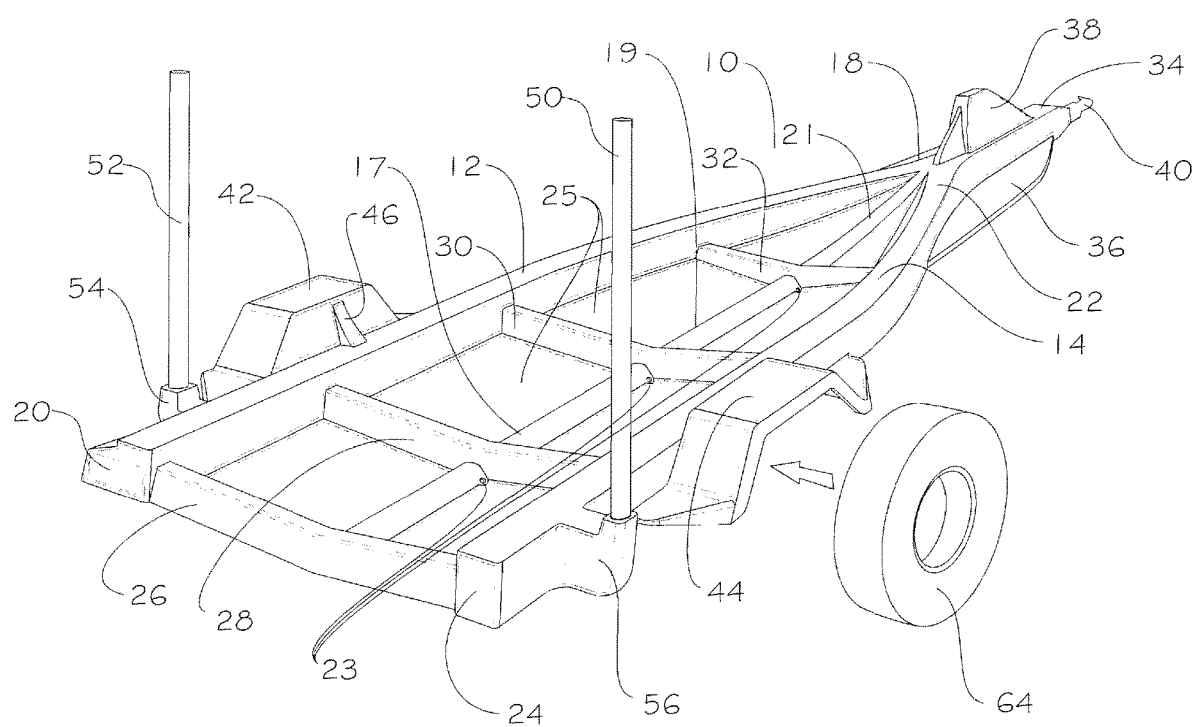
FIG. 1 is a perspective view of a one piece composite boat trailer.
Figure 2:
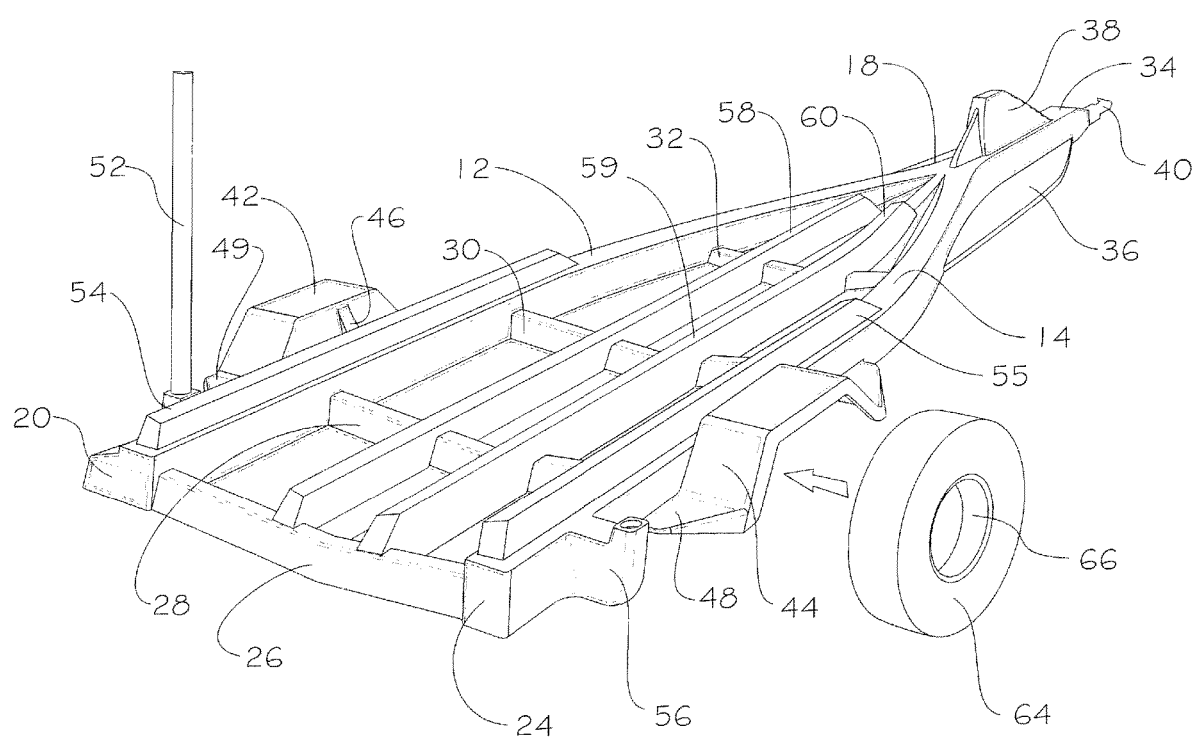
FIG. 2 is a perspective view of a small boat composite boat trailer with bunks.

Referring to FIGS. 1-2, illustrated is a boat trailer 10 formed from composite materials. The boat trailer is formed from a first beam 12 spaced apart from a second beam 14. The beams are constructed from FRP (fiberglass reinforced polymer) or CFRP (carbon fiber reinforced polymer) pultruded tube. Pultrusion forms a composite tube by pulling fibers and resin through a heated die. The resulting beam is 75% lighter than steel, and 30% lighter than aluminum for the same strength. The FRP is noncorrosive, nonconductive, easy to repair and easy to paint.

The first beam 12 is defined by a first front end section 18 and a first rear end 20. Similarly, the second beam 14 has a second front end section 22, and a second rear end 24. Between the rear ends 20, 24 is a rear transition section 16 coupling a first cross beam 26 spaced apart from the second cross beam 28. A second transition section 17 coupling the second cross beam 28 to a third cross beam 30. A third transition section 19 coupling the third cross beam 30 to a fourth cross beam 32. A fourth transition section 21 coupling the fourth cross beam 32 to the first and second front end sections 18 and 22. Drain holes 23 are used to inhibit the trapping of water within the transition sections. Panels 25 secure the transition sections allowing smaller sized cross beams yet provide equivalent structural rigidity.

The front of the trailer includes a tongue 34 that is reinforced 36 with a support platform 38 for a winch, not shown. At the end of the tongue 34 is an attachment hitch D.O.T. trailer coupler 40. The trailer includes integrated wheel covers 42, 44. An integrated bracket 46 provides wheel cover reinforcement. The wheel covers include step sections 48, 49 to allow ease of access to a vessel placed on the trailer. Alignment poles 50, 52 are supported by integrated bases 56 to facilitate the loading of a boat onto the trailer. Outer bunks 54 and 55 can be customized to meet the outer curvature of a boat hull, similarly inner bunks 58 and 59 can be customized to meet the inner curvature of a boat hull. By way of example, the tip 60 of the bunks can be curved along the bow of the boat, a procedure that is not possible with common wood bunks. The curvature allows a better distribution of weight across the bunks to reduce flexing of a boat hull during transport which is known to lead to spider cracks in the gelcoat.

Referring to FIGS. 6-9, while the trailer of the instant invention can be made with the methods described above, in a preferred embodiment the frame is molded with a finish on a bottom side. The methods of fabrication can be female or male molded in temporary or permanent style tooling. They may be molded over formers created by 3D printing the desired sizes and features and laminating or vacuum applications of laminates over the forms.

The frame 100 is formed from a continuous outer wall 101 spaced apart from an inner wall 102 by a bottom wall 110 forming a U-shaped front left beam 122, a side left beam 123, a rear beam 124, a right beam 125, and a front right beam 126. The left bam 123, rear beam 124 and right beam forming a substantially rectangular section 133 formed integral with the front left beam 122 and front right beam 126 which form the triangular shaped towing section 135. The inner wall 102 having side walls 103 forming a matrix of structural support members 114 molded in a cross pattern for transfer of stresses between the left and right side beams 123, 125. The outer wall 101, inner wall 102, bottom wall 110 and side walls 103 are molded as a single piece element. A bottom plate 104 encapsulates the beams forming a finished surface beneath the rectangular section and towing section with drain holes 105 to allow water to evacuate from the enclosed spaces. Alternatively, the bottom plate 104 can be eliminated between the matrix of side walls for weight saving. The frame transitions along the frontal section with front left beam 122 and front right beam 126 into a towing point 106 for attachment to a towing vehicle by tapering the spaced apart longitudinal beams formed by the inner and outward walls together to form a single attachment point. Bosses 107 reduces towing stresses adds stiffness to avoid stresses and provides a mounting point for a hitch 116. The one piece composite frame receives a deck 113 constructed and arranged to be attached to the frame. The deck 113 allowing ease of replacement if damaged, without having to replace the frame.

Other features that are usually added on by bolting or welding may be molded in as part of the laminating or forming process (any of wet bagging, infusion or spray in mold methods) such as light bezels 108 or license plate flats 109 or even structural features such as suspension mounting surfaces 110 for brakes. A wheel assembly 111 including a fender 112 is bolted to the frame to allow transport. Features which enhance the performance may be molded as part of the frame or added on as separate parts such as leaf, torsion springs, or rubber mounts for the wheels.

Receivers, pivot points, hinge mounts and upright sockets 115 may be molded in or added on as separate items. These types of features will be used to provide attachment points for Railings, fairings, cargo and tool boxes and other desired features shown in FIGS. 3-5. All of these features combined provide for trailers which can easily be customized and transform from one purpose to another with little effort especially because the composite materials are lightweight, rust proof, and interchangeable. For example, a cargo box can be a traveling work room one day and a shed the next, while the trailer becomes a motorcycle hauler for the weekend.

Figure 3:
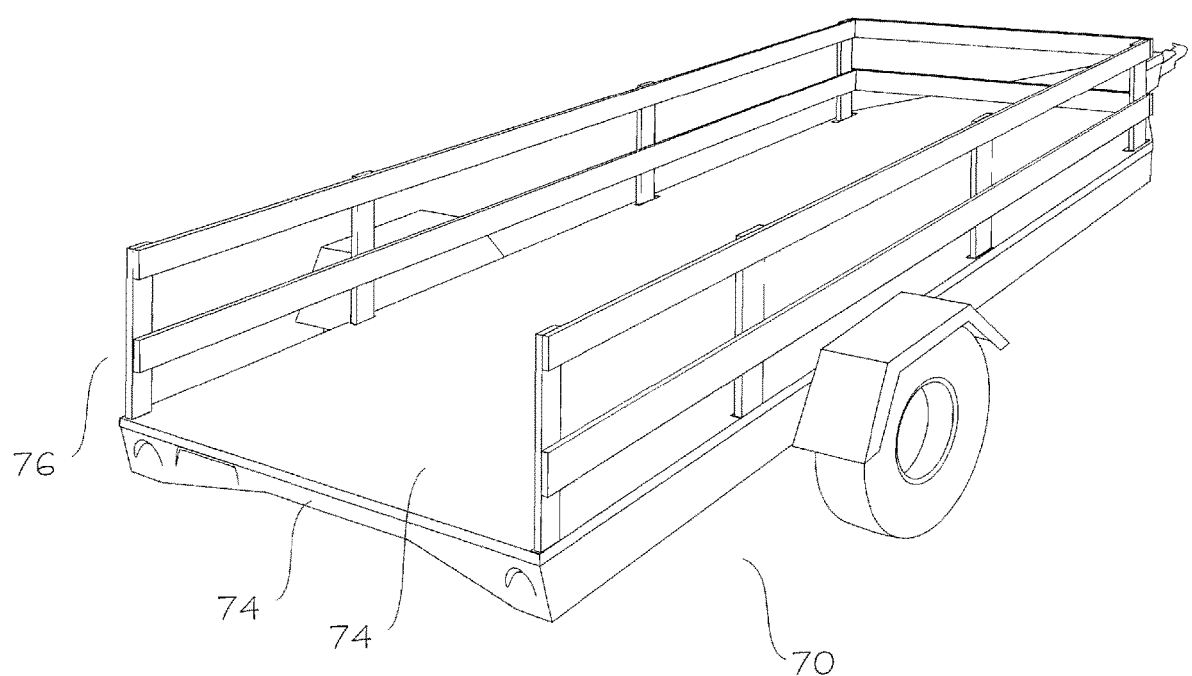
FIG. 3 is a perspective view of a composite flat bed trailer with a fence guard.
Figure 4:
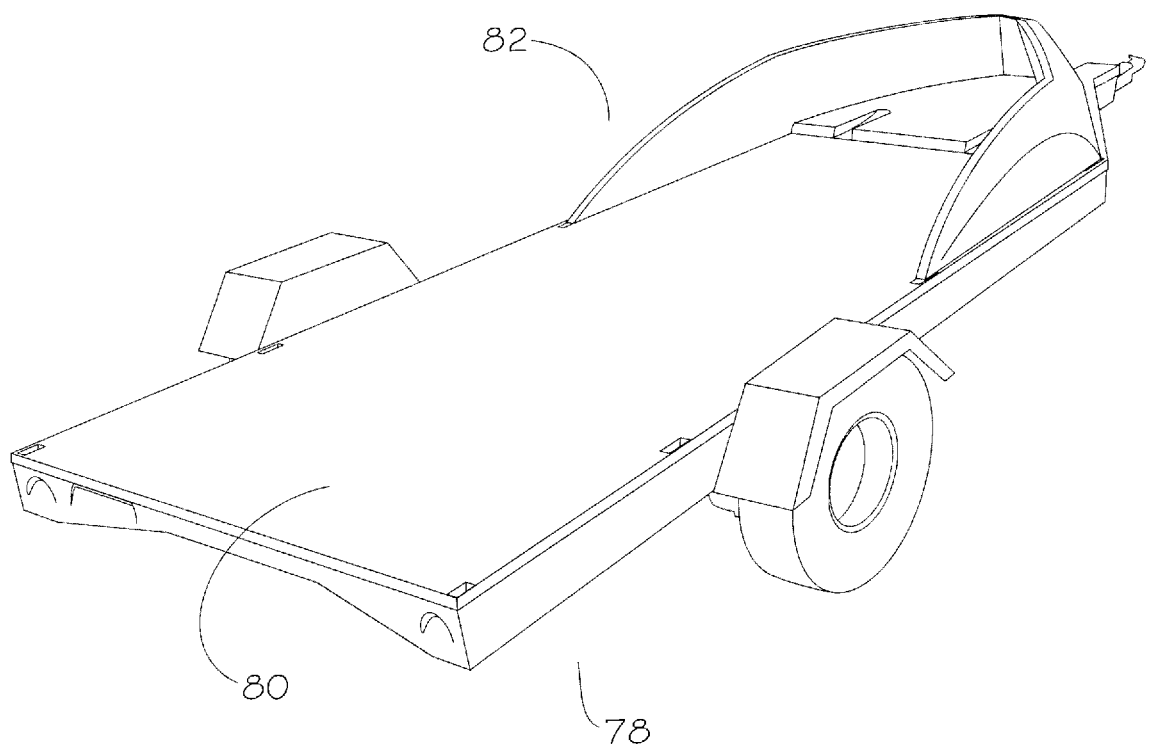
FIG. 4 is a perspective view of a composite flat bed trailer with a front shield.
Figure 5:
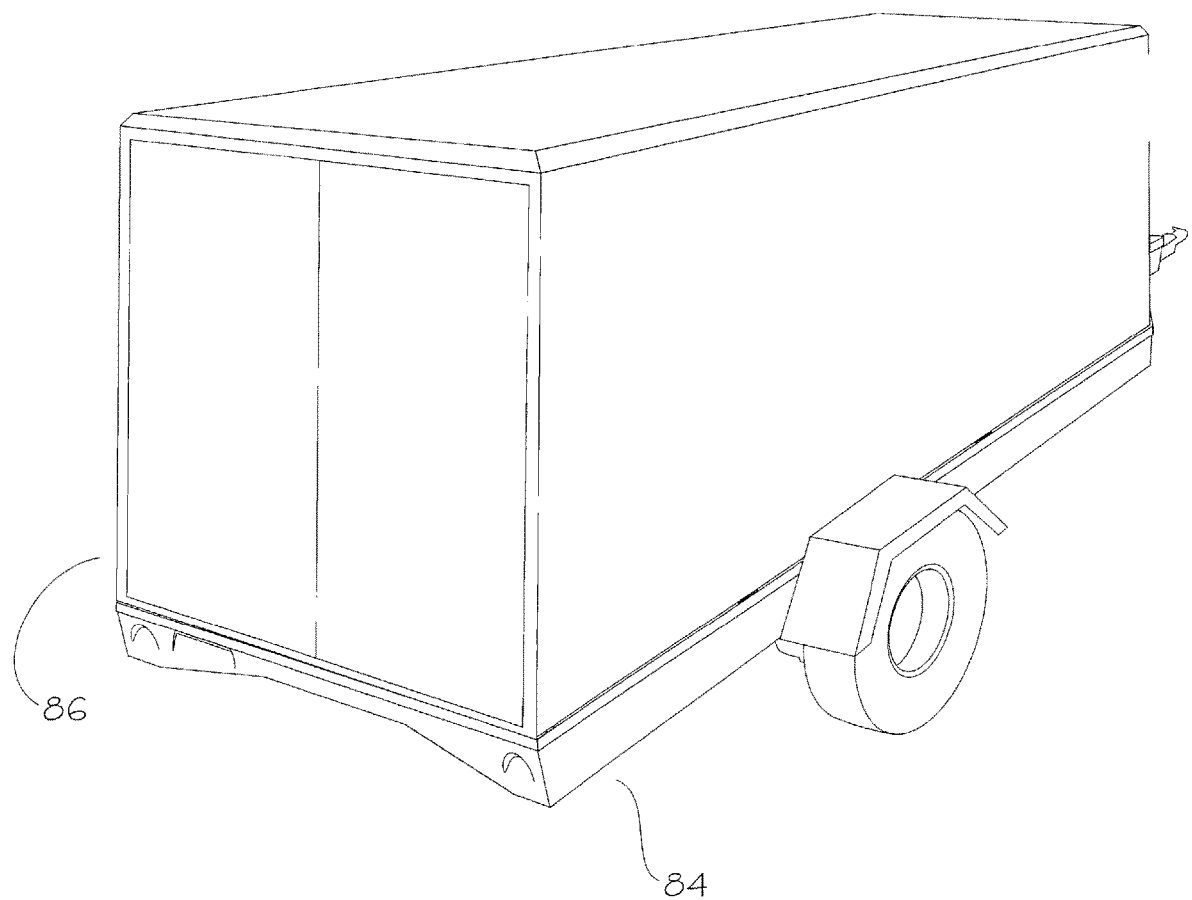
FIG. 5 is a perspective view of a composite flat bed trailer with an enclosure.
Figure 6:
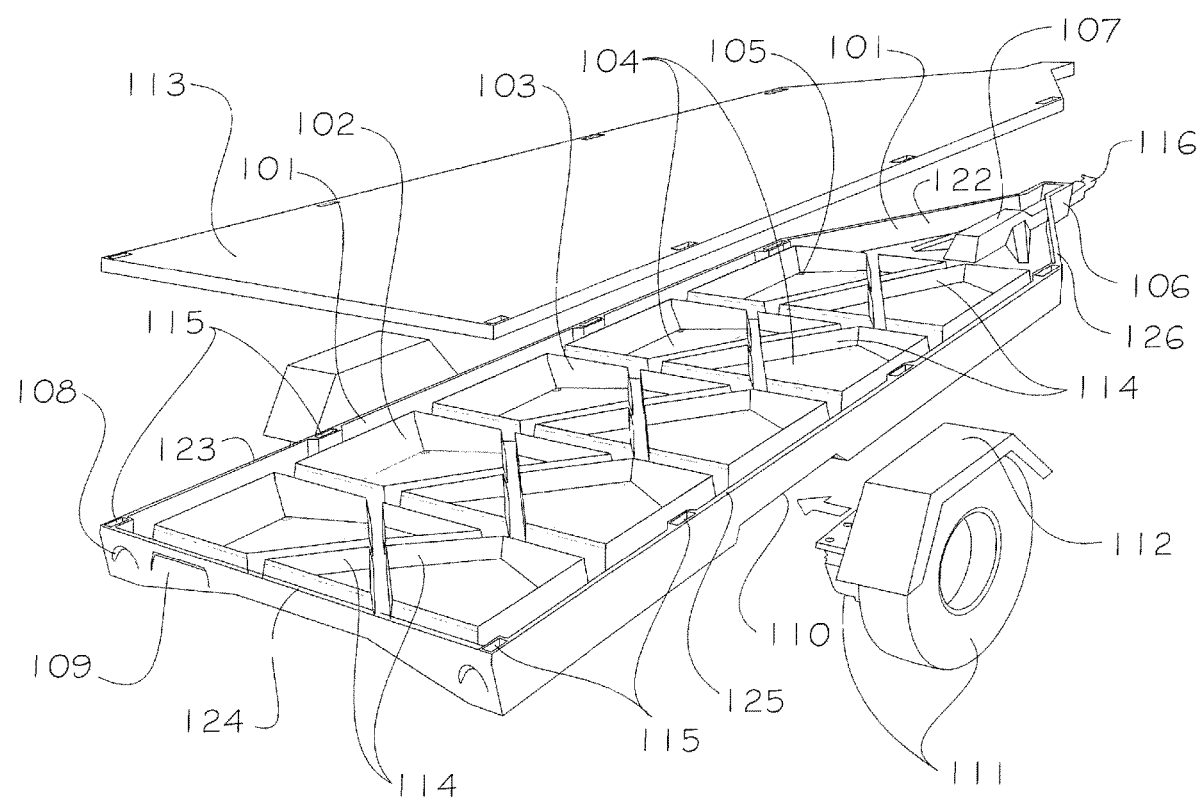
FIG. 6 is a upper perspective exploded view of the composite flat bed trailer.
Figure 7:
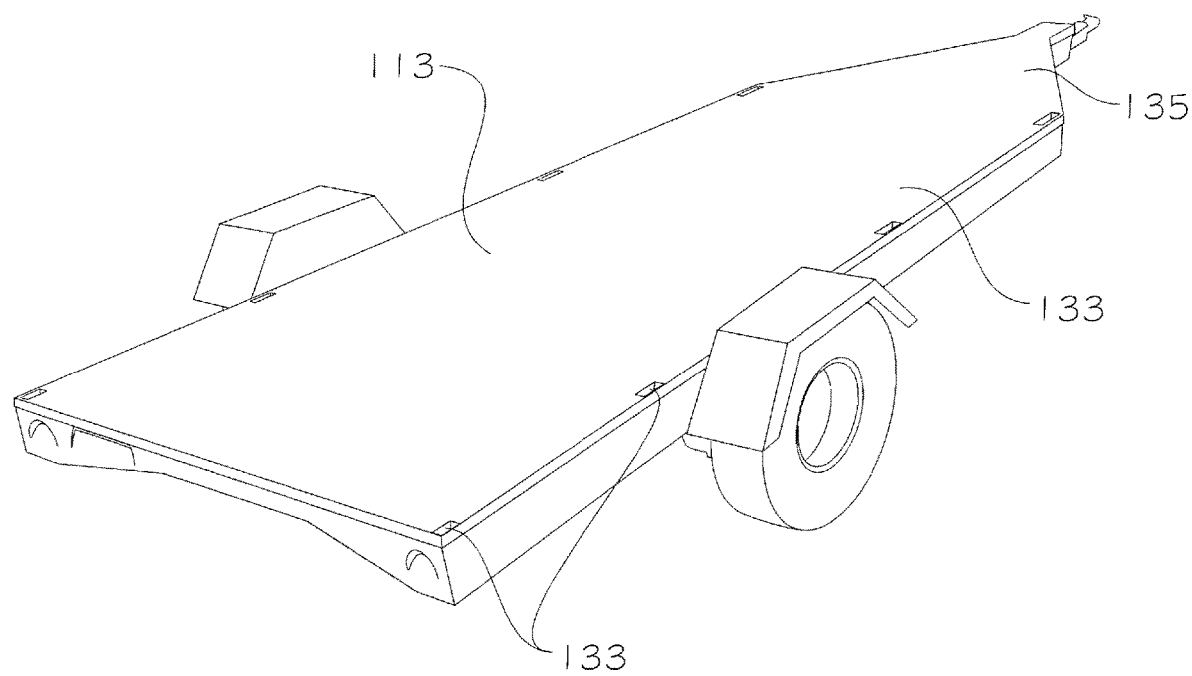
FIG. 7 is a perspective view of the composition flat bed trailer depicted in FIG. 6.
Figure 8:
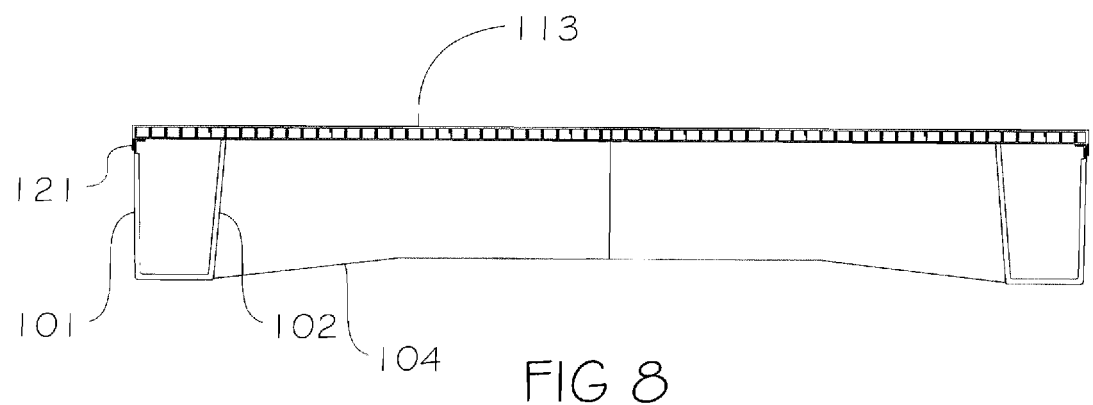
FIG. 8 is a cross sectional end view depicting the composite flat bed trailer deck.
Figure 9:
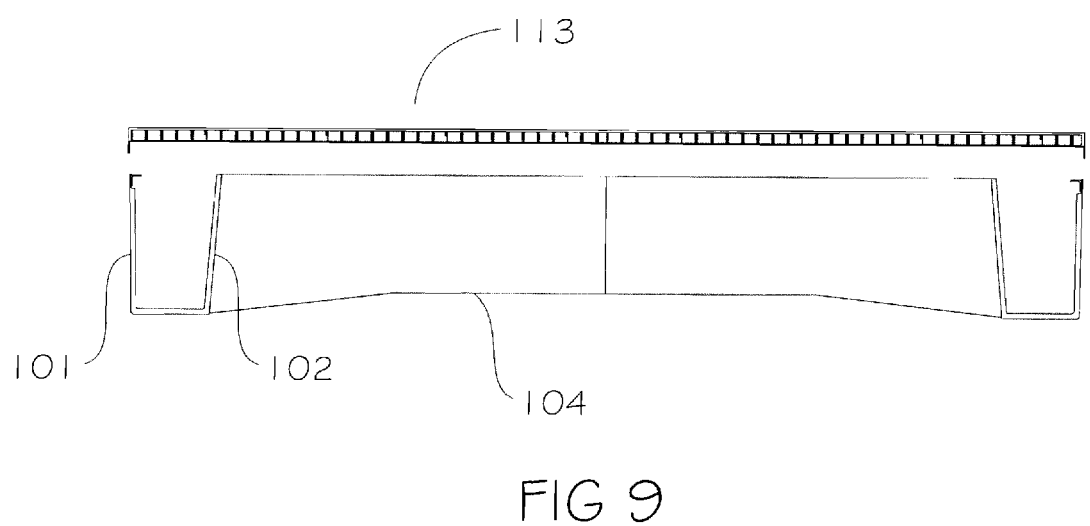
FIG. 9 is a cross sectional end view depicting the composite flat bed trailer deck in an exploded position.

FIG. 3 is a perspective view of a composite flat bed trailer 70 having a flat deck 72 having a composite frame 74 with a fence guard 76. FIG. 4 is a perspective view of a composite flat bed trailer 78 having a flat deck 80 with a front shield 82 secured to the top of the towing section. FIG. 5 is a perspective view of a composite flat bed trailer 84 with an enclosure 86.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

While this specification sets forth a boat trailer as a primary embodiment, it will be obvious to one skilled in the art that the trailer disclosed herein can be adapted for car haulers, ATV trailers, pool cleaner trailers, motorcycle trailers, lawnmower trailers, personal watercraft trailers, flatbed trailers, box trailers, horse trailers, tractor trailers, heavy equipment trailers, expandable trailers, dump trailers, airplane trailers, canoe trailers, livestock trailers, agricultural trailers, pop-up trailers, pickup bed campers, snow mobile trailers, RV and coach chassis/body assemblies.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

What is claimed is:

1. A trailer comprising: a frame molded from polymer having a continuous outer wall defining a rectangular section and a triangular shaped towing section, said outer wall having a lower edge molded to a bottom wall plate encompassing the rectangular section and towing section; an inner wall is spaced apart from said outer wall a predetermined distance including support walls that crisscross the rectangular section to provide a matrix for stiffing of said frame; a boss formed integral with said towing section provides a mounting point for a trailer hitch; a deck is securable to an upper edge of said outer wall over said towing section and said rectangular section; and a pair of wheel assemblies is coupled to said bottom wall plate.

2. The trailer according to claim 1 wherein said polymer is FRP (fiberglass reinforced polymer).

3. The trailer according to claim 1 wherein said polymer is carbon fiber reinforced.

4. The trailer according to claim 1 wherein said deck is attached by fasteners wherein said deck can be replaced if damaged.

5. The trailer according to claim 1 wherein inner wall is spaced apart with said outer wall and adjoined by said bottom wall plate to form substantially U-shaped beams, namely a front left beam, a left beam, a rear beam, a right beam, and a front right beam.

6. The trailer according to claim 1 wherein bottom wall plate includes drainage holes.

7. The trailer according to claim 1 including light bezels molded to said outer wall.

8. The trailer according to claim 1 wherein said inner walls, said outer wall, said support wall and said bottom plate wall is formed from a single mold.

9. The trailer according to claim 1 including a shield secured to the top of said towing section.

10. The trailer according to claim 1 including an enclosure secured to the top of said deck covering said towing section and said rectangular section.

11. The trailer according to claim 1 including a plurality of upright sockets formed integral with said outer wall wherein said deck having apertures allowing access to said upright sockets.

12. The trailer according to claim 11 including a fence guard constructed and arranged to engage said upright sockets.

13. The trailer according to claim 1 including a first and second integrated base formed integral with said outer wall, each said integrated base constructed and arranged to receive an alignment pole.

* * * * *